(12) United States Patent
Kok

(10) Patent No.: US 11,370,637 B2
(45) Date of Patent: Jun. 28, 2022

(54) APPARATUS FOR CORELESS FILM ROLL

(71) Applicant: GT-MAX PLASTIC INDUSTRIES (M) SDN. BHD., Selangor (MY)

(72) Inventor: Gan Thiam Kok, Selangor (MY)

(73) Assignee: GT-MAX PLASTIC INDUSTRIES (M) SDN. BHD., Selangor (MY)

( * ) Notice: Subject to any disclaimer, the term of this patent is extended or adjusted under 35 U.S.C. 154(b) by 54 days.

(21) Appl. No.: 17/034,450

(22) Filed: Sep. 28, 2020

(65) Prior Publication Data
US 2021/0101774 A1 Apr. 8, 2021

(30) Foreign Application Priority Data
Oct. 3, 2019 (MY) .............................. PI2019005861

(51) Int. Cl.
*B65H 75/24* (2006.01)
*B65H 75/30* (2006.01)

(52) U.S. Cl.
CPC ........... *B65H 75/245* (2013.01); *B65H 75/30* (2013.01); *B65H 2401/113* (2013.01)

(58) Field of Classification Search
USPC ..................................................... 242/586.6
See application file for complete search history.

(56) References Cited

U.S. PATENT DOCUMENTS

| | | | | |
|---|---|---|---|---|
| 341,633 A | * | 5/1886 | Barker | |
| 925,425 A | * | 6/1909 | Easier | |
| 1,082,166 A | * | 12/1913 | Northrop | B65H 75/28 242/586 |
| 3,952,963 A | * | 4/1976 | Ueno | B65H 75/04 242/610.1 |
| 5,785,272 A | * | 7/1998 | Slade | B65H 75/28 242/532.5 |
| 6,386,476 B1 | * | 5/2002 | Adleman, Jr. | E04G 23/006 156/763 |
| 9,725,269 B2 | * | 8/2017 | Cheng | B65H 18/28 |
| 2003/0122030 A1 | * | 7/2003 | Imai | B65H 75/28 242/586.6 |
| 2003/0146336 A1 | * | 8/2003 | Imai | G11B 23/037 242/579 |
| 2009/0272832 A1 | * | 11/2009 | Gantzer | B65H 75/48 242/379.2 |
| 2021/0380362 A1 | * | 12/2021 | Sundermann | B65H 75/10 |

* cited by examiner

*Primary Examiner* — William A. Rivera
(74) *Attorney, Agent, or Firm* — Muncy, Geissler, Olds & Lowe, P.C.

(57) ABSTRACT

The present disclosure relates to an apparatus (100) or a reusable dispenser adaptable for mounting coreless stretch film (106) comprising a hollow cylindrical body (101) with at least one elongated slit (102) along the length of the cylindrical body wherein, the body has a right portion (107*a*) and a left portion (107*b*), and an outer wall (104) in which at least one of the left or right portion (107*a*, 107*b*) is compressed for slotting into an opening of the film roll (106), such that the outer wall (104) mounts firmly onto inner wall (105) of the opening for grasping the surface of inner sheet of the film roll during dispensing.

8 Claims, 2 Drawing Sheets

APPARATUS FOR CORELESS FILM ROLL

TECHNICAL FIELD

The present invention relates to an apparatus for unwinding film from a coreless stretch film roll. In particular, the present invention relates to a reusable dispenser adaptable for mounting coreless stretch film roll, in order to unwind film from said coreless film roll.

BACKGROUND OF INVENTION

Stretch film is a highly stretchable and elastic, clear plastic film that can be used to wrap packages, furniture, and any other type of articles for storage or transport. It is tear resistant and clings to itself extremely well. There are many types of reusable dispensers for a variety of stretch films that are currently available in the market today. Most of the commercial stretch films use end-cups or end-handles that are utilized to support the thick paper core of a conventional stretch film roll as an alternative to using hands to hold the film roll during wrapping of any type of articles by a user. With respect to coreless stretch film, an existing conventional dispenser requires the use of fingers of a user to be placed on both ends of the internal diameter of said dispenser for radial unwinding of the film. The conventional dispenser is usually not able to mount the coreless stretch film roll firmly along the inner circumference of the coreless film roll.

Thus, the film layers toward the inner end of the roll or closest to the inner diameter of the film roll tends to get clumped and damaged by the action of friction and pressure that occur when the dispenser is pressed loosely or less firmly through the inner diameter of the film roll and this would cause wastage. Further, most dispensers are unmalleable or inflexible in terms of diameter for accommodating and reinforcing the different inner diameters of coreless film rolls, and to protect the film particularly towards the inner end of the roll from bending or clumping together and becoming unusable. Moreover, most of the dispensers for coreless stretch films which are available on the market today are costly and complex to manufacture.

Therefore, the present invention provides solutions to the current problems by accommodating various internal diameters of coreless stretch film rolls firmly, with simpler functional design and lower cost.

SUMMARY OF INVENTION

The present invention relates to an apparatus for unwinding film from a coreless stretch film roll. In particular, the present invention relates to a reusable dispenser adaptable for mounting coreless stretch film roll, in order to unwind film from said coreless film roll.

One embodiment of the present invention provides an apparatus for coreless film roll comprising a hollow cylindrical body with at least one elongated slit along the length of the cylindrical body, wherein the body has a left portion and a right portion, and an outer wall in which at least one of the left or right portion is compressed for slotting into an opening of the film roll, such that the outer wall mounts firmly onto inner wall of the opening for grasping the surface of inner sheet of the film roll during dispensing.

Preferably, the outer wall of the body overlay uniformly on the inner wall of the opening of the film roll to hold the film roll so that the last film layers remain intact.

Preferably, the hollow cylindrical body is adaptable to be hand compressed to decrease the diameter of the hollow cylindrical body so to be fitted into inner circumference of stretch film roll for mounting said stretch film roll firmly when compression is released.

Preferably, the apparatus is a core for coreless film roll and able to accommodate detachable coreless film roll dispenser meant to control dispensing of stretch film roll.

Preferably, the hollow cylindrical body is made of stabilised polyvinyl chloride (PVC), metal, any resilient plastic material, rubber, rubberised fabric, cork or any material having elastic characteristic.

Preferably, the hollow cylindrical body is able to mount coreless stretch film rolls, paper rolls, wallpaper rolls, textile rolls or any rolled adhesive material.

Preferably, the hollow cylindrical body has same or bigger diameter than the inner wall of the coreless film roll.

Preferably, wherein the hollow cylindrical body has same or bigger diameter than the opening of the coreless film roll.

Preferably, the hollow cylindrical body is made of a sheet of plastic material forming a tubular construction adaptable into a coreless stretch film, in which the opposing ends of said sheet overlap; and the outer wall of the elongated member adheres to the inner wall of the coreless stretch film for providing better friction during dispensing of the film.

One embodiment of the present invention provides a method of making an apparatus for coreless film roll comprising obtaining a hollow cylindrical body having elastic characteristic, and creating a linear slit along the length of the hollow cylindrical body, wherein the body has a left portion and a right portion, to be compressible for slotting into an opening of the film roll, such that the outer wall of the body mounts firmly onto inner wall of the opening for grasping the surface of inner sheet of the film roll during dispensing that the last film layers remain intact during the process of dispensing.

The present invention may be embodied in other specific forms without departing from its essential characteristics. The described embodiments are to be considered in all respects only as illustrative and not restrictive. The scope of the invention is, therefore indicated by the appended claims rather than by the foregoing description. All changes, which come within the meaning and range of equivalency of the claims, are to be embraced within their scope.

BRIEF DESCRIPTION OF DRAWINGS

To further clarify various aspects of some embodiments of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the accompanying drawings in which.

DETAILED DESCRIPTION OF THE PREFERRED EMBODIMENTS

In light of the aforementioned problem associated with dispensers for coreless stretch film roll, the present invention relates to the modification of materials and design used for producing the reusable dispenser adaptable for mounting coreless stretch film roll.

Hereinafter, the dispenser for coreless stretch film according to the present invention will be described in detail with reference to FIG. 1 through FIG. 2 according to the preferred embodiments. It is to be understood that limiting the description to the preferred embodiments of the invention is merely to facilitate discussion of the present invention and it is envisioned without departing from the scope of the appended claims.

Figure 1:
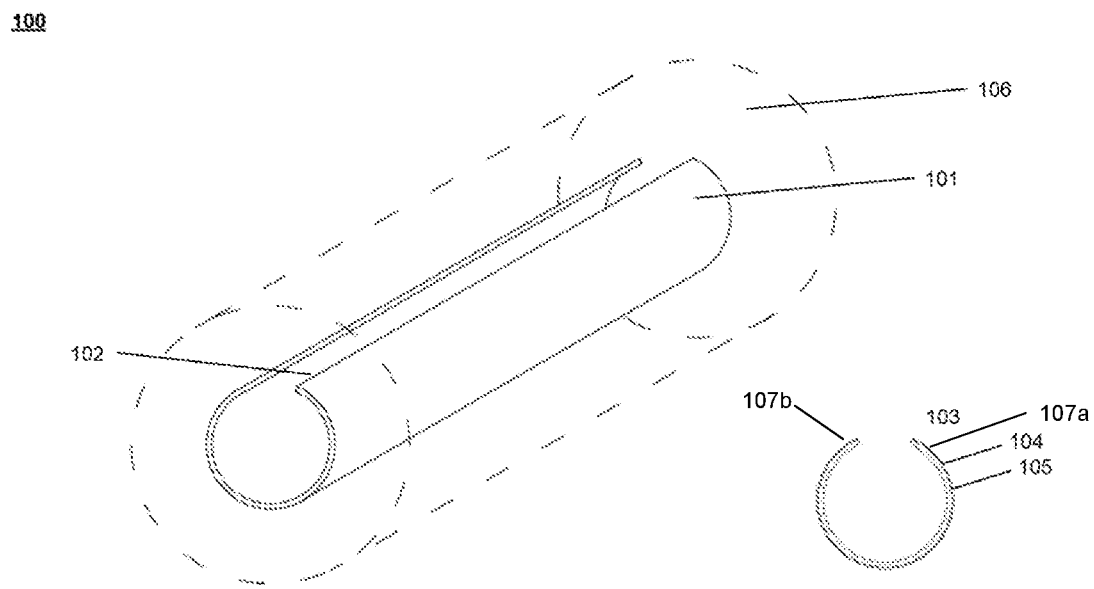
FIG. 1 shows a reusable dispenser adaptable for mounting coreless stretch film roll.

The present invention as presented in FIG. 1 shows a reusable dispenser (100) adaptable for mounting coreless stretch film roll (106). The reusable dispenser is a hollow cylindrical body (101) with at least one elongated slit (102) along the length of the cylindrical body forming a C-shape cross-section (103). The elongated slit forms a left portion and a right portion (107a, 107b) along the length of the hollow cylindrical body (101) located between one end of the C-shape cross section (103) and the other end of the C-shape cross section (103).

In the cross-sectional view (103) of the reusable dispenser (101), the outer wall (104) of the cylindrical body (101) adheres to inner circumference of coreless stretch film roll (106) for providing better friction during dispensing of the film (106). The cylindrical body (101) compensates for some radial distortion of the inner circumference of the coreless stretch film roll (106). The hollow cylindrical body (101) also has a surface area that is sufficient for maintaining adhesive integrity of the last layers of a coreless stretch film roll (106) by mounting the coreless stretch film roll firmly along the length and inner circumference (105) of the coreless film roll (106).

The hollow cylindrical body (101) of the reusable dispenser (100) is adaptable to be hand compressed to decrease its cylindrical diameter, in order to be fitted into the inner circumference (105) of the coreless stretch film roll (106).

In order to decrease the diameter of the hollow cylindrical body (101), at least one of the left or right portion (107a, 107b) is compressed for slotting into an opening of the film roll (106), such that the outer wall (104) of the hollow cylindrical body mounts firmly onto inner wall (105) of the opening for grasping the surface of the inner sheet of the film roll during dispensing.

Because of its elasticity, the reusable dispenser (101) will try to return to its original shape and diameter size when released from compression, just like a spring. This will result in the outer wall (104) of the hollow cylindrical body (101) to adhere to the inner wall (105) firmly. The outer wall (104) of the body overlay uniformly on the inner wall (105) of the opening of the film roll to hold the film roll (106) so that the last film layers remain intact.

Inner wall (105) of the opening of the coreless film roll (106) consists of last film layers. As the film roll is being dispensed, the force which holds the shape of the coreless film roll (106) becomes weaker as the film roll becomes thinner in diameter. Because the film roll are coreless, without the thick paper core or any other type of core, the last film layers tends to become clumped and damaged easily.

Figure 2:
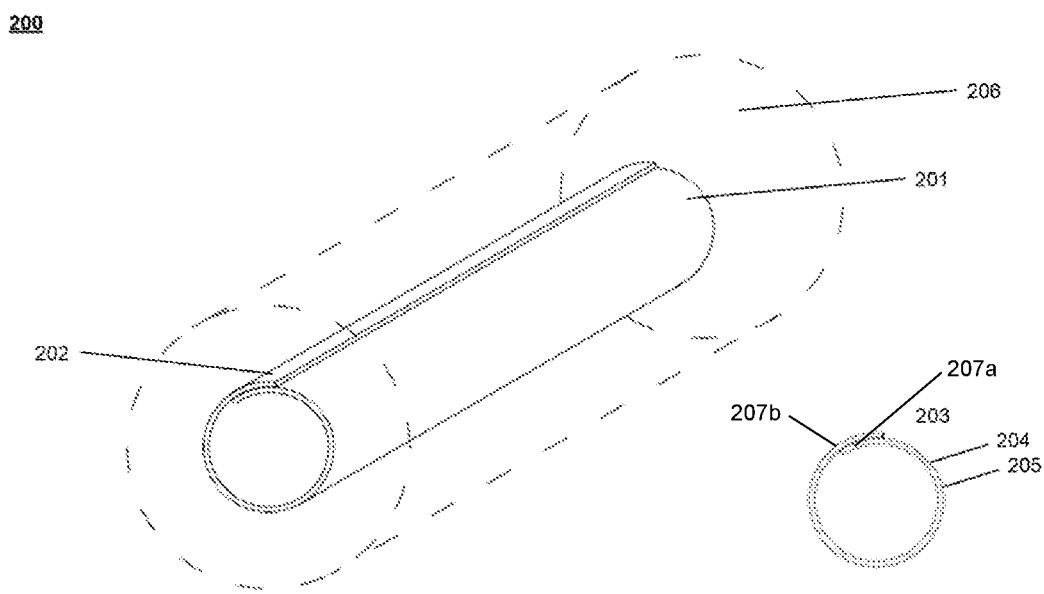
FIG. 2 shows an alternative embodiment of the reusable dispenser adaptable for mounting coreless stretch film roll.

FIG. 2 is an alternative embodiment of the reusable dispenser (200) adaptable for mounting coreless stretch film (206). The reusable dispenser (200) is a hollow cylindrical body (201) with at least one elongated slit (202) along the length of the cylindrical body, where a left portion and a right portion (207a, 207b) located along the length of the elongated slit overlap, forming a spiral-shaped cross-section (203). In a cross-sectional view (203) of the reusable dispenser (201), the outer wall (204) of the cylindrical body (201) adheres to the inner circumference (205) of the coreless stretch film roll (206) for providing better friction during dispensing of the film (206).

The hollow cylindrical body (201) of the reusable dispenser (200) is adaptable to be hand compressed to decrease its cylindrical diameter, in order to be fitted into the inner circumference (205) of the coreless stretch film roll (206).

In order to decrease the diameter of the hollow cylindrical body (201), at least one of the left or right portion (207a, 207b) is compressed for slotting into an opening of the film roll (206), such that the outer wall (204) of the hollow cylindrical body mounts firmly onto inner wall (205) of the opening for grasping the surface of the inner sheet of the film roll during dispensing.

The reusable dispenser adaptable for mounting coreless stretch film may be used as a core for coreless film roll and able to accommodate typical stretch film dispenser such as detachable handles or stopper meant for controlling dispensing of stretch film roll.

In a different embodiment, the hollow cylindrical body (201) is made of a sheet of plastic material forming a tubular construction adaptable to be inserted into a coreless stretch film (206), in which the opposing ends (207a, 207b) of said sheet overlap, and the outer wall (204) of the body adheres to the inner wall (205) of the coreless stretch film (206) for providing better friction during dispensing of the film.

The stretch film material is usually composed of polyethylene, polyvinyl chloride, ethylene vinyl acetate, ethylene methyl acetate, ethylene copolymer with higher alpha olefins, commonly referred to as linear low-density polyethylene, or LLDPE or any other plastic film suitable for wrapping or other like application. The plastic film can be pre-stretched for added strength, or unstretched. However, it has been found that certain films which have not been pre-stretched, as are well known to those of skill in the art, can benefit from aging before being formed into a coreless plastic film roll. As used herein, "aging" the plastic film refers to a process of storing master rolls of plastic film to permit certain residual products of manufacture to dissipate from the film. The master rolls are, typically, aged for up to three weeks, if applicable.

A preferred embodiment of the apparatus of the present disclosure is a that it is made of materials having elastic characteristic such as stabilised polyvinyl chloride (PVC) or its known variation thereof, any other resilient plastic material, rubber, rubberised fabric, or cork. PVC is well-known for its mechanical properties that are advantageous to various applications. The elastic modulus of a rigid PVC can reach up to 3000 MPa, while the soft PVC has a significantly lower elastic limit of approximately 15 MPa maximum. Other elastic material such as metal may also be used. Additionally, the construction material making up the C-shaped elongated member can vary with the nature of materials it is purposed for, including paper products such as paper rolls, wallpaper rolls, textiles rolls or any other adhesive material. The C-shaped elongated member can come in various diameters, and lengths to accommodate the properties of materials it is purposed for.

The apparatus (100) for coreless stretch film roll (106) of the present invention has the same or bigger diameter than the inner diameter than the inner wall (105) of the coreless film roll (106) to accommodate the varying sizes of diameter of the coreless rolls it is purposed to be used with. As discussed earlier, the diameter of the apparatus can be decreased by compression, to enable the hollow cylindrical body to be slotted into the opening of the coreless film roll. When compression is released, the outer wall (104) of the apparatus overlay upon the inner wall (105) uniformly providing firm support for the last film layers.

The present disclosure also provides a method of making an apparatus for a coreless film roll comprising steps of obtaining a hollow cylindrical body (101) having elastic characteristic, creating a linear slit (102) along the length of the hollow cylindrical body (101). The linear slit (102) forms a left portion and a right portion (107a, 107b), to be compressible for slotting into an opening of the film roll (106), such that outer wall (105) of the body mounts firmly onto inner wall (105) of the opening for grasping the surface of inner sheet of the film roll during dispensing that the last film layers remain intact during the process of dispensing.

Throughout this specification, unless the context requires otherwise, the word "comprise", or variations such as "comprises" or "comprising", will be understood to imply the inclusion of a stated step or element or integer or group of steps or elements or elements or integers, but not the exclusion of any other step or element or integer or group of steps, elements or integers. Thus, in the context of this specification, the term "comprising" is used in an inclusive sense and thus should be understood as meaning "including principally, but not necessarily solely".

The invention claimed is:

1. An apparatus for coreless film roll with an inner wall consisting of last film layers, comprising:
   a hollow cylindrical body having elastic characteristics with at least one elongated slit along the length of the hollow cylindrical body;
   wherein, the hollow cylindrical body has a right portion and a left portion, and an outer wall in which at least one of the left or right portion is compressed for slotting into an opening of the film roll wherein the hollow cylindrical body has same or bigger diameter than the inner wall of the coreless film roll, such that the outer wall mounts firmly onto the inner wall of the opening of the film roll for grasping the surface of inner sheet of the film roll during dispensing; and
   when the hollow cylindrical body is released from the compression, the outer wall of the hollow cylindrical body adheres firmly to the inner wall, and the outer wall of the hollow cylindrical body overlay uniformly on the inner wall of the opening of the film roll to hold the film roll so that the last film layers remain intact.

2. The apparatus according to claim 1, wherein the hollow cylindrical body is adaptable to be hand compressed to decrease the diameter of the hollow cylindrical body so to be fitted into inner circumference of stretch film roll for mounting said stretch film roll firmly when compression is released.

3. The apparatus according to claim 1, wherein the apparatus acts as a core for coreless film roll and able to accommodate coreless film roll dispenser meant to control dispensing of stretch film roll.

4. The apparatus according to claim 1, wherein the hollow cylindrical body is made of stabilised polyvinyl chloride (PVC), metal, any resilient plastic material, rubber, rubberised fabric, cork or any material having elastic characteristic.

5. The apparatus according to claim 1, wherein the hollow cylindrical body is able to mount coreless stretch film rolls, paper rolls, wallpaper rolls, textile rolls or any rolled adhesive material.

6. The apparatus according to claim 1, wherein the hollow cylindrical body has same or bigger diameter than the opening of the coreless film roll.

7. The apparatus according to claim 1, wherein the hollow cylindrical body is made of a sheet of plastic material forming a tubular construction adaptable into a coreless stretch film, in which opposing ends of said sheet overlap; and the outer wall of the body adheres to the inner wall of the coreless stretch film for providing better friction during dispensing of the film.

8. A method of making an apparatus for coreless film roll with an inner wall consisting of last film layers, comprising steps of:
   obtaining a hollow cylindrical body having elastic characteristic; and
   creating a linear slit along the length of the hollow cylindrical body,
   wherein, the linear slit forms a right portion and a left portion, to be compressible for slotting into an opening of the film roll, wherein the hollow cylindrical body has same or bigger diameter than the inner wall of an opening of the coreless film roll such that outer wall of the body mounts firmly onto the inner wall of the opening of the film roll for grasping the surface of inner sheet of the film roll during dispensing so that the last film layers remain intact during the process of dispensing;
   when the hollow cylindrical body is released from the compression, the outer wall of the hollow cylindrical body adheres firmly to the inner wall, and the outer wall of the hollow cylindrical body overlay uniformly on the inner wall of the opening of the film roll to hold the film roll so that the last film layers remain intact.

* * * * *